United States Patent
Crean et al.

(10) Patent No.: US 7,797,187 B2
(45) Date of Patent: Sep. 14, 2010

(54) SYSTEM AND METHOD OF PROTECTING PRICES

(75) Inventors: Hugh Crean, Seattle, WA (US); Jay Bartot, Seattle, WA (US); David Hsu, Santa Monica, CA (US); Oren Etzioni, Seattle, WA (US); Michael Fridgen, Seattle, WA (US)

(73) Assignee: Farecast, Inc., Seattle, WA (US)

( * ) Notice: Subject to any disclaimer, the term of this patent is extended or adjusted under 35 U.S.C. 154(b) by 662 days.

(21) Appl. No.: 11/599,607

(22) Filed: Nov. 13, 2006

(65) Prior Publication Data

US 2008/0114622 A1    May 15, 2008

(51) Int. Cl.
G06F 17/30 (2006.01)
G06F 17/50 (2006.01)
G06F 17/00 (2006.01)
G06F 30/00 (2006.01)

(52) U.S. Cl. .................... 705/10; 705/400; 705/26; 705/14.1; 705/7; 705/5

(58) Field of Classification Search ............ 705/5, 705/6, 7, 26, 27, 14, 1.1, 10, 14.1, 14.34, 705/14.38, 14.39, 400
See application file for complete search history.

(56) References Cited

U.S. PATENT DOCUMENTS

| | | |
|---|---|---|
| 4,837,744 A | 6/1989 | Marquot et al. |
| 5,021,693 A | 6/1991 | Shima et al. |
| 5,237,499 A | 8/1993 | Garback |
| 5,255,184 A | 10/1993 | Hornick |
| 5,270,921 A | 12/1993 | Hornick |
| 5,289,401 A | 2/1994 | Shima |
| 5,704,017 A | 12/1997 | Heckerman |
| 5,732,398 A | 3/1998 | Tagawa |
| 5,794,207 A | 8/1998 | Walker et al. |
| 5,797,127 A | 8/1998 | Walker et al. |
| 5,832,452 A | 11/1998 | Schneider et al. |
| 5,864,818 A | 1/1999 | Feldman |
| 5,875,126 A | 2/1999 | Minch et al. |

(Continued)

FOREIGN PATENT DOCUMENTS

EP    1148433 A1    10/2001

(Continued)

OTHER PUBLICATIONS

U.S. Appl. No. 11/675,499, filed Feb. 15, 2007, Crean et al.

(Continued)

Primary Examiner—Igor Borissov
(74) Attorney, Agent, or Firm—Perkins Coie LLP

(57) ABSTRACT

A method and system for protecting prices is provided. The price protection system increases consumer confidence when making purchases by reducing the risk associated with fluctuating prices. The price protection system receives a purchase specification from a consumer. Next, the price protection system determines the risk that the prices of items matching the purchase specification will change and reports a protected price to the consumer that represents the price that the price protection system will protect based on the determined risk for a protection period. Finally, the price protection system receives a request from the consumer to purchase protection of the protected price.

17 Claims, 7 Drawing Sheets

U.S. PATENT DOCUMENTS

| | | |
|---|---|---|
| 5,897,620 A | 4/1999 | Walker et al. |
| 5,918,209 A | 6/1999 | Campbell et al. |
| 5,933,039 A | 8/1999 | Hui et al. |
| 6,041,308 A | 3/2000 | Walker et al. |
| 6,076,070 A | 6/2000 | Stack |
| 6,085,169 A | 7/2000 | Walker et al. |
| 6,092,017 A | 7/2000 | Ishida et al. |
| 6,108,639 A | 8/2000 | Walker et al. |
| 6,112,185 A | 8/2000 | Walker et al. |
| 6,134,534 A | 10/2000 | Walker et al. |
| 6,240,396 B1 | 5/2001 | Walker et al. |
| 6,263,323 B1 | 7/2001 | Baggett |
| 6,275,808 B1 | 8/2001 | Demarcken |
| 6,295,521 B1 | 9/2001 | Demarcken |
| 6,307,572 B1 | 10/2001 | Demarcken |
| 6,332,129 B1 | 12/2001 | Walker et al. |
| 6,345,090 B1 | 2/2002 | Walker et al. |
| 6,356,878 B1 | 3/2002 | Walker et al. |
| 6,377,932 B1 | 4/2002 | Demarcken |
| 6,381,578 B1 | 4/2002 | Demarcken |
| 6,418,413 B2 | 7/2002 | Demarcken |
| 6,418,415 B1 | 7/2002 | Walker et al. |
| 6,442,526 B1 | 8/2002 | Vance et al. |
| 6,484,153 B1 | 11/2002 | Walker et al. |
| 6,510,418 B1 | 1/2003 | Case et al. |
| 6,553,346 B1 | 4/2003 | Walker et al. |
| 6,567,824 B2 | 5/2003 | Fox |
| 6,609,098 B1 | 8/2003 | Demarcken |
| 6,658,422 B1 | 12/2003 | Levanoni |
| 6,974,079 B1 | 12/2005 | Strothmann et al. |
| 7,010,494 B2 * | 3/2006 | Etzioni et al. ............ 705/10 |
| 7,076,451 B1 | 7/2006 | Coupland et al. |
| 7,181,410 B1 | 2/2007 | Jones et al. |
| 2001/0039519 A1 | 11/2001 | Richards |
| 2002/0002548 A1 | 1/2002 | Roundtree |
| 2002/0032666 A1 | 3/2002 | Kawamura |
| 2002/0082877 A1 | 6/2002 | Schiff et al. |
| 2002/0111935 A1 | 8/2002 | Jones et al. |
| 2002/0116348 A1 | 8/2002 | Phillips et al. |
| 2002/0120492 A1 | 8/2002 | Phillips et al. |
| 2002/0152111 A1 | 10/2002 | Cox et al. |
| 2002/0156659 A1 | 10/2002 | Walker et al. |
| 2002/0156661 A1 | 10/2002 | Jones et al. |
| 2002/0161689 A1 | 10/2002 | Segal |
| 2002/0169760 A1 | 11/2002 | Cheung et al. |
| 2002/0178069 A1 | 11/2002 | Walker et al. |
| 2002/0184059 A1 | 12/2002 | Offutt et al. |
| 2003/0004760 A1 | 1/2003 | Schiff et al. |
| 2003/0033164 A1 | 2/2003 | Faltings et al. |
| 2003/0036928 A1 | 2/2003 | Kenigsberg et al. |
| 2003/0040946 A1 | 2/2003 | Sprenger et al. |
| 2003/0055779 A1 | 3/2003 | Wolf |
| 2003/0061179 A1 | 3/2003 | Reece |
| 2003/0061211 A1 | 3/2003 | Shultz et al. |
| 2003/0069747 A1 | 4/2003 | Strothmann et al. |
| 2003/0125994 A1 | 7/2003 | Jaehn et al. |
| 2003/0130899 A1 | 7/2003 | Ferguson et al. |
| 2003/0182052 A1 | 9/2003 | DeLorme et al. |
| 2003/0187705 A1 | 10/2003 | Schiff et al. |
| 2003/0187771 A1 | 10/2003 | Bulan |
| 2003/0187772 A1 | 10/2003 | Papka |
| 2003/0225608 A1 | 12/2003 | Wu et al. |
| 2003/0229552 A1 | 12/2003 | Lebaric et al. |
| 2004/0078252 A1 | 4/2004 | Daughtrey et al. |
| 2004/0098287 A1 | 5/2004 | Young et al. |
| 2004/0249683 A1 | 12/2004 | Demarcken et al. |
| 2005/0033616 A1 | 2/2005 | Vavul et al. |
| 2005/0044001 A1 | 2/2005 | Narayanaswami |
| 2005/0086087 A1 | 4/2005 | Razza et al. |
| 2005/0090911 A1 | 4/2005 | Ingargiola et al. |
| 2005/0091146 A1 | 4/2005 | Levinson |
| 2005/0154620 A1 | 7/2005 | Hentschel et al. |
| 2005/0177402 A1 | 8/2005 | Walker et al. |
| 2005/0197893 A1 | 9/2005 | Landau et al. |
| 2005/0216301 A1 | 9/2005 | Brown |
| 2006/0064333 A1 | 3/2006 | Razza et al. |
| 2006/0116901 A1 | 6/2006 | Ookubo et al. |
| 2006/0129463 A1 | 6/2006 | Zicherman |
| 2006/0161480 A1 | 7/2006 | Christensen |
| 2006/0173753 A1 | 8/2006 | Padmanabhan et al. |
| 2006/0235768 A1 | 10/2006 | Tatum et al. |
| 2007/0021991 A1 | 1/2007 | Etzioni et al. |
| 2007/0038553 A1 * | 2/2007 | Miller et al. ............ 705/37 |
| 2007/0061174 A1 | 3/2007 | Phillips |
| 2007/0226084 A1 | 9/2007 | Cowles |
| 2008/0046298 A1 | 2/2008 | Ben-Yehuda et al. |
| 2008/0228658 A1 | 9/2008 | Crean et al. |
| 2009/0030746 A1 | 1/2009 | Etzioni et al. |
| 2009/0063167 A1 | 3/2009 | Bartot et al. |

FOREIGN PATENT DOCUMENTS

| | | |
|---|---|---|
| JP | 2131012 A2 | 5/1990 |
| JP | 5335656 A2 | 12/1993 |
| JP | 2002092249 A2 | 3/2002 |
| JP | 2002259779 A2 | 9/2002 |
| JP | 2002358472 A2 | 12/2002 |
| WO | WO-03052550 A | 6/2003 |
| WO | WO-03052550 A2 | 10/2003 |
| WO | WO-03081385 A | 10/2003 |
| WO | WO-03081385 A2 | 10/2003 |

OTHER PUBLICATIONS

U.S. Appl. No. 11/675,585, filed Feb. 15, 2007, Fridgen.

U.S. Appl. No. 11/675,589, filed Feb. 15, 2007, Fridgen.

U.S. Appl. No. 11/675,594, filed Feb. 15, 2007, Crean et al.

U.S. Appl. No. 11/675,617, filed Feb. 15, 2007, Fridgen.

U.S. Appl. No. 11/675,619, filed Feb. 15, 2007, Crean et al.

U.S. Appl. No. 11/772,523, filed Jul. 2, 2007, Etzioni et al.

U.S. Appl. No. 11/846,507, filed Aug. 28, 2007, Bartot.

Belobaba, Peter P., "Application of a Probabilistic Decision Model to Airline Seat Inventory Control," Mar.-Apr. 1989; Operations Research, pp. 183-197.

Chmielewski, Dawn C., "San Francisco-Based Film Develops Technology for Interactive TV," Apr. 19, 2001, KRTBN Knight Ridder Tribune Business News (San Jose Mercury News, California), 2 pages.

Cohen, William W., "Fast Effective Rule Induction," Proceedings of the 12th International Conference on Machine Learning 1995, 10 pages.

Davis et al., "BLUR-the speed of change in the connected economy," Sep./Oct. 2002, British Journal of Administrative Management, n22, pp. 20.

Etzioni, Oren, et al., "To Buy or Not to Buy: Mining Airfare Data to Minimize Ticket Purchase Price," Proceedings of the Ninth ACM SIGKDD 2003, Aug. 24-27, 2003, Washington, D.C., 10 pages.

Harrill, Rob, "Airline analyzer could save big bucks by advising when to buy tickets," Apr. 1, 2003, University of Washington; http://www.washington.edu/newsroom/news/2003archive/04-03archive/k040103.html.

ITA Software, "Corporate Background," accessed Feb. 9, 2004, 1 page.

Muehlbauer, Jen, "Orbitz Reaches New Heights, Better technology results in a competitive advantage," CMP Media LLC, Apr. 2002, pp. 1-5.

RIVALWATCH.COM, 1999-2003, 13 pages.

Robinson, Sara, "Computer Scientists Find Unexpected Depths In Airfare Search Problem," Society for Industrial and Applied Mathematics, Jul./Aug. 2002, pp. 1-6.

Sutton, Richard S., et al., "Reinforcement Learning: An Introduction," MIT Press, Cambridge, MA, 1998, pp. 1-3, http://www-anw.cs.umass.edu/~rich/book/the-book.html, accessed May 5, 2004.

Ting, Kai Ming et al., "Issues in Stacked Generalization," Journal of Artificial Intelligence Research 10 (1999), pp. 271-289.

U.S. Appl. No. 12/044,229, filed Mar. 7, 2008, Etzioni et al.
U.S. Appl. No. 12/037,775, filed Feb. 26, 2008, Crean.
U.S. Appl. No. 12/048,154, filed Mar. 13, 2008, Crean et al.
U.S. Appl. No. 11/928,725, filed Oct. 30, 2007, Etzioni et al.
U.S. Appl. No. 12/253,195, filed Oct. 16, 2008, Crean et al.
Bly, L., "Comparison-Shopping Tools Lure Travelers," USA Today, Oct. 17, 2003 (3 pages).
"NexTag Launches ServicesShopping (SM) With Comparison Shopping for Mortgages, Travel Cars, Real Estate and Education," PR Newswire, Oct. 25, 2004 (2 pages).
TravelCLICK, Hotelligence Report, http://web.archive.org/web/20040202113915/http://www.travelclick.net/Tours/HOTELLIGENCE/HotelligenceSa_SPDFVERSION.pdf, Feb. 2, 2004 (14 pages).
Tedeschi, B., "Orbitz Offers Options for Flexible Travelers," http://proquest.umi.com/pqdweb?did=334784901&sid=1&Fmt=3&clientId=19649&RQT=309&Vnames=PQD, May 11, 2003 (2 pages).
PCT International Search Report, US06/02136, Applicant: Search Party, Inc., Mailing Date: Aug. 17, 2007, (2 pages).
PCT International Search Report, US2008/074680, Applicant: Farecast, Inc., Mailing Date: Mar. 19, 2009, (3 pages).
PCT International Search Report, US08/56901, Applicant: Farecast, Inc., Mailing Date: Jun. 25, 2008, (3 pages).
PCT International Search Report, US07/62332, Applicant: Farecast Inc., Mailing Date: Sep. 25, 2007, (2 pages).
PCT International Search Report, US04/09498, Applicant: University of Washington, Mailing Date: Aug. 2, 2005, (2 pages).
PCT International Search Report, US07/83882, Applicant: Farecast, Inc., Mailing Date: May 7, 2008, (2 pages).
Castleworks, Inc., "Daily Schedule," Feb. 5, 2004, (2 pages).

* cited by examiner

*FIG. 4*

Farecast™ Beta - Know When to Buy

Home | My Account - Sign In / Register

All Times (Listed) | Select Times (Grid) | | | | | | Learn more about List View

Results for:
Leave: All Times
Seattle, WA (SEA)
Fri, Nov 10 2006
Return: All Times
Los Angeles, CA (LAX)
Mon, Nov 13 2006
Adults: 1    Change Search Looking for a Fare Guard?
Learn how to find one.

Fare Prediction
532

Lowest fares rising $40
Confidence: 71%
536

Tip: Buy Now.

Not ready to buy? Set up a Fare Alert for this trip.
☑ Fare Alert

Fare History
91-Day Low: $219   Avg Low: $243
$450
$400
$350
$300
$250
$200
90 Days Ago                 540        Now

Refine Results [ Reset ]
Showing 341 of 341 options

▼ Price Range $421                          $1210

Stops
☑ 0         $421
☑ 1         $431
☐ 2+          -

Airlines Compare
☑ Alaska          $549
☑ America West    $461
☑ American        $549
☑ Delta           $602
☑ Frontier        $1123
☑ Northwest       $554

| Price ▼ | Airline | Airport | Departs | Arrives | Stops |
|---|---|---|---|---|---|
| $421 united.com | United flight details | SEA>LAX | 2:48p | 5:25p | 0 \| 2h 37m |
| $421 united.com | United flight details | LAX>SEA | 7:17a | 9:57a | 0 \| 2h 40m |
| $421 united.com | United flight details | SEA>LAX | 6:20p | 8:59p | 0 \| 2h 39m |
| $421 united.com | United flight details | LAX>SEA | 7:17a | 9:57a | 0 \| 2h 40m |
| $421 united.com | United flight details | SEA>LAX | 11:20a | 2:00p | 0 \| 2h 40m |
| $421 united.com | United flight details | LAX>SEA | 7:17a | 9:57a | 0 \| 2h 40m |
| $431 united.com | United flight details | SEA>LAX | 6:05a | 8:49a | 0 \| 2h 44m |
| $431 united.com | United flight details | LAX>SEA | 7:17a | 9:57a | 0 \| 2h 40m |
| $431 united.com | United flight details | SEA>LAX | 2:48p | 5:25p | 0 \| 2h 37m |
| $431 united.com | United flight details | LAX>SEA | 8:19p | 12:19a | 1 \| 4h 0m |
| $431 united.com | United flight details | SEA>LAX | 6:20p | 8:59p | 0 \| 2h 39m |
| $431 united.com | United flight details | LAX>SEA | 8:19p | 12:19a | 1 \| 4h 0m |
| $431 united.com | United flight details | SEA>LAX | 11:20a | 2:00p | 0 \| 2h 40m |
| $431 united.com | United flight details | LAX>SEA | 8:19p | 12:19a | 1 \| 4h 0m |
| $431 united.com | United flight details | SEA>LAX | 6:05a | 8:49a | 0 \| 2h 44m |
| $431 united.com | United flight details | LAX>SEA | 8:19p | 12:19a | 1 \| 4h 0m |

Planning Tools
Flexible? Fares from $219
Track this trip with RSS

*Sponsored Link*
Packages to Los Angeles
Book Flight + Hotel on Orbitz to save $258 on average

*Sponsored Links*
Los Angeles Hotels

Los Angeles CA Hotel - Orbitz
Sort hotels by price, distance, star rating, and amenities. Book now.
www.orbitz.com Where to Stay in Los Angeles
Find great hotels. Citysearch reviews, recommendations, maps and more.
losangeles.citysearch.com Los Angeles Downtown Hotel
Wilshire Grand Hotel in downtown Los Angeles, CA is walking distance to...
www.wilshiregrand.com Beach Front LA Hotel
Historic Hang Out Of The Stars Walk To The Boardwalk. Try Surfing.
www.georgianhotel.com

*Sponsored Links*
Activities in Los Angeles

Hollywood Tour Specialist

*FIG. 5*

Farecast™
Beta
*Know When to Buy*

Home | My Account - Sign Out

Confirmation/Receipt

Print Receipt

1. Your Fare Guard order has been processed  Print Official Terms

The credit card ending ****1111 has been charged $1.00

Your confirmation number is: 26

To access your Fare Guard status and redeem (after booking your ticket), go to your account.

2. Your Selection

> Guarded Low: $312 until Thu, Nov 16, 2006 at 8:59 pm PT.  — 620
>
> Cities & Dates: Leave: Seattle, WA (SEA) - Wed. Dec 20, 2006
> Return: Los Angeles, CA (LAX) - Tue. Dec 26, 2006  — 630
>
> Grand Total: $1.00 ($1/person, reg. $9.95/person - Promo ends 1/1/07) — 650

640 (between 620 and 630)

⎬ 610

[ HOME ]

Let us know what you think. Take a Fare Guard Survey.

---

About Us | Beta Info | Blog | How It Works | Privacy Policy | Site Map | Support | Terms of Use Sign up for Email | Fare Guard Survey | Tell a Friend | Track a Trip via RSS We're certified by TRUSTe. © 2006 Farecast, Inc. version

*FIG. 6*

Farecast Beta — Know When to Buy

Home | My Account - Sign Out

Review & Request

Review & Request > Mailing Info > Confirmation

1. Your Redemption Request

For Confirmation: 11

Guarded Low: $280 until Thu, Nov 16, 2006 8:59 PM PST.

Cities & Dates: Leave: Seattle, WA (SEA) - Tue, Dec 12, 2006
Return: Kansas City, MO (MCI) - Tue, Dec 19, 2006

Adults: 1 (0 of 1 redeemed)

⟩ 710

Estimated Redemption Amount:
730 — $287 Lowest Fare Thu, Nov 9, 2006 (Your booking date)
— $280 Fare Guard Protected Price
735 — $7 Estimated Redemption Amount
(Actual amount will be determined upon verification of booking)

⟩ 720

2. Redemption Step-by-Step

- Send us your booking confirmation (as provided by the airline website or online travel agency where you purchased) and provide information for reimbursement.
- Farecast will verify your booking and redemption amount. (Amount is determined by the difference between the Fare Guarded price and the lowest price on the day you booked your ticket.)
- Once verification is complete, Farecast will send your redemption via U.S. mail.

⟩ 740

3. Booking Information

Number of Adults: * [1 ▼]
Web Site Used: * [aa.com ▼]
Confirmation Code: * [h5b24j]  Found on your receipt
Ticket Number 1: * [00121221453465]  10-16 digits
Your total per person must be greater than your original price of $280
Total Per Person: * $ [287]  = $287 for 1 traveler(s)
Questions & Comments: [                    ]

⟩ 750

[ BACK ]    [ CONTINUE ]

About Us | Beta Info | Blog | How It Works | Privacy Policy | Site Map | Support | Terms of Use
Sign up for Email | Fare Guard Survey | Tell a Friend | Track a Trip via RSS

*FIG. 7*

SYSTEM AND METHOD OF PROTECTING PRICES

BACKGROUND

Consumers depend on passenger airlines to take them all over the world. Business travelers use airlines to take them to visit clients, negotiate business deals, purchase equipment, and much more. Personal travelers use airlines to go on vacations, visit family members, and so on.

A number of factors affect ticket prices for airline flights. Using the money that passengers pay for tickets, airlines must pay for the purchase or lease of airplanes and other equipment, fuel costs, maintenance, employee salaries, government taxes, terminal fees, and still leave enough to make their business profitable. Each of these factors can vary substantially. For example, the cost of airplanes can vary from year to year based on competition between airplane manufacturers and other economic factors. Fuel prices can vary based on the current price of oil, and major disasters such as hurricanes that affect the price of oil and refining capacity. Employee salaries can change based on strikes and contract negotiations. Government taxes on airlines often change, and may vary among countries thus affecting airlines that fly internationally. Airlines sometimes incorrectly balance these factors and undergo bankruptcy or other business reorganizations that affect the price charged for tickets.

In addition to each of these factors, competition among airlines is often intense, leading to fare wars in which one airline attempts to fill seats by undercutting the prices of each of the other airlines servicing a particular route. Moreover, unexpected events may affect the demand for a particular route. For example, a sports team may make it into the playoffs leading to an increase in flights by fans wanting to attend the playoffs. Similarly, a dignitary such as the Pope or President may announce a visit to a particular city, leading to an increase in flights to that city by those that want to see the dignitary. There are also seasonal demands for purchasing airline tickets, causing an increase in ticket purchases around holidays such as Thanksgiving and Christmas. Route changes may also affect demand. For example, an airline may stop servicing an unpopular route. This leaves fewer carriers servicing that route and can lead to a situation where one carrier has a monopoly on that route such that prices increase.

All of these factors affect the price of the ticket charged to consumers. Price fluctuations in airline ticket prices are very common, making purchasing tickets for an airline flight a daunting task. It is difficult for a consumer to determine the best time to purchase a ticket to get the best price. A consumer may purchase a ticket one day only to find out that a fare war has begun the next day leading to a large drop in the ticket price. However, if the consumer waits to purchase the ticket the ticket may increase in price. This may cause the consumer to spend more than they intended or to cancel the trip altogether. A lack of confidence in ticket prices negatively affects consumer spending for airline tickets and frustrates consumers.

BRIEF DESCRIPTION OF THE DRAWINGS

FIG. 4 illustrates a display page of the user interface of the price protection system for purchasing protection in one embodiment.

FIG. 5 illustrates a display page of the user interface of the price protection system when no protection is offered in one embodiment.

FIG. 6 illustrates a display page of the user interface of the price protection system for confirming a purchase of protection in one embodiment.

FIG. 7 illustrates a display page of the user interface of the price protection system for redeeming protection in one embodiment.

DETAILED DESCRIPTION

Figure 1:
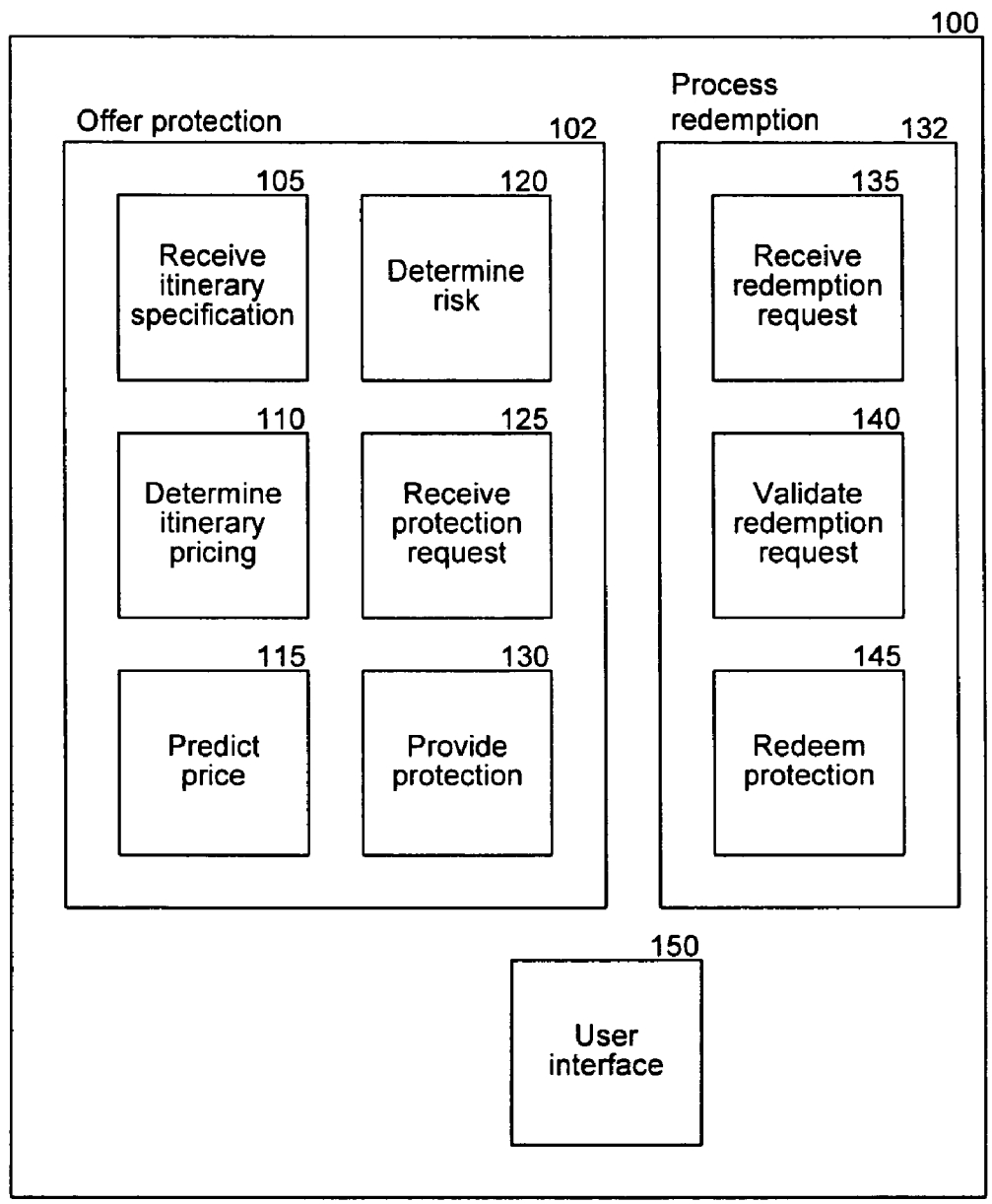
FIG. 1 is a block diagram that illustrates components of the price protection system in one embodiment.

A method and system for protecting prices is provided. The price protection system increases consumer confidence when making purchases by reducing the risk associated with fluctuating prices. The following describes the price protection system in terms of protecting airline or flight itinerary prices. The price protection system may, however, be used to protect prices for various purchases, leases, rentals, and other types of acquisitions for a variety of items such as hotel rooms, rental cars, cruises, automobiles, houses, stock, and so on. In one embodiment, the price protection system initially receives an itinerary specification from the consumer. For example, when searching for air travel the itinerary specification may specify a location where the consumer wants to travel, what airport they want to leave from, the dates and times that they want to travel, whether the consumer wants a direct flight, how many companions are traveling with the consumer, and so on. Next, the price protection system locates available tickets that match the itinerary specification, and determines the risk that the current lowest prices of the tickets will change. For example, available tickets may be determined using a flight reservation system, such as Sabre, ITA Software, or an online travel agent. Risk of price fluctuations can be determined in a number of ways, including based on technologies described in U.S. Pat. No. 7,010,494, entitled "PERFORMING PREDICTIVE PRICING BASED ON HISTORICAL DATA," which is hereby incorporated by reference. Assuming the risk is acceptable, the price protection system reports to the consumer that price protection is available for the itinerary specification, along with a protected price and a protection fee. The protected price represents the price that the price protection system will protect against price changes based on the determined risk. For example, if the current lowest price of a ticket for an itinerary is $200, and the price protection system determines that the price of tickets for the itinerary is likely to drop by $50 in the near future, then the price protection system may offer a protected price of $200 to the consumer for the itinerary for a protection period. The price protection system may track the lowest available prices for the itinerary during the protection period (e.g., seven days), and if the lowest price of the itinerary increases during the protection period and the consumer purchases a ticket for more than the protected price, then the price protection system will offer compensation to the consumer based on the difference between the protected price and a redemption price (e.g., the lowest available price tracked by the price protection system) for a ticket matching the itinerary specification.

The redemption price may be the price that the consumer actually pays for the ticket, or it may be calculated based on the lowest price found by the price protection system on the day or time of the consumer's purchase, the lowest price available during the protection period, or a similar method. If the redemption price were less than the protected price, then the price protection system would not owe the consumer any compensation. If, however, the redemption price is greater than the protected price, then the price protection system will offer compensation to the consumer based on the difference. For example, if the consumer received a protected price of $200, the redemption price is $250, and the consumer buys a ticket for $250 during the protection period, then the price protection system will offer compensation to the consumer for the additional $50 the consumer spent over the protected price. If the consumer actually bought a ticket for $300 even though the redemption price was $250 (e.g., the lowest available ticket price), the price protection system may still offer compensation for only $50. If, on the other hand, the consumer found a ticket for $150, then the price protection system will not offer the consumer any compensation. Compensation may take many forms such as cash reimbursement, bonus frequent flyer miles, credit to an account, payment through PayPal, and so on.

The price protection system charges a protection fee to the consumer to purchase the price protection for the itinerary. If the price protection system correctly predicts that the price will not increase, then the price protection system keeps the fee and does not offer the consumer any compensation. If instead the lowest available price for tickets matching the itinerary specification increases and the consumer purchases a ticket at the increased price, then the price protection system still keeps the fee, but also offers the consumer compensation. In this way, the price protection system protects the consumer from unexpected price increases, but the consumer may still benefit from a price drop by purchasing the protection while delaying their purchase of the ticket. This price protection allows the consumer to buy with confidence and wait for a better price than the protected price.

In some embodiments, the price protection system protects the consumer against decreasing prices after the consumer purchases a ticket. For example, if a consumer purchases a ticket for $200 based on a prediction from the price protection system indicating that prices are likely to increase, but instead prices go down, then the price protection system can still protect the consumer. In this situation, the protected price is the price that the consumer actually paid for the ticket, and the redemption price is the lower price that becomes available. Protection may be limited to a protection period (e.g., seven days), similar to the protection period described above for protection against price increases. For example, if the consumer buys a ticket for $200 and purchases protection against price decreases for seven days, and the price protection system determines that the price decreases to $150 within the seven days, then the price protection system offers the consumer compensation based on the $50 difference in prices.

In some embodiments, the price protection system offers tickets for purchase as a convenience to the consumer. In general, the price protection system need not determine whether the consumer will actually purchase a ticket or whether a ticket is available on the day that the consumer decides to purchase the ticket. However, by offering ticket purchases through the price protection system (or a system affiliated with the price protection system), the system may reduce the effort of supporting a redemption request by eliminating a separate step of verifying the purchase price paid by the consumer. Alternatively or additionally, the price protection system may allow the consumer to purchase the ticket through other outlets, such as a travel agent or the airline itself, and then provide information about the purchase to the price protection system to validate a redemption request.

Setting the Protection Fee

In some embodiments, the price protection system sets a fixed protection fee. For example, the price protection system may charge a fixed fee of $10 for protecting the price of a ticket at a particular protected price. The consumer pays this fee whether the price of the ticket goes up, down, or remains the same. For example, if the consumer receives a protected price of $200, and later purchases the ticket for $250, then the price protection system offers compensation to the consumer for the $50 increase, but retains the $10 fee. Conversely, if the consumer later purchases the ticket for $150, then the price protection system does not offer the consumer any compensation, and retains the $10 fee. Each consumer pays a fractional amount of the cost of a negative event (e.g., a ticket price increase) for protection against the risk that the negative event occurs. If the negative event does occur, then the consumer's loss is limited to the price of the protection (i.e., the protection fee). The protection system may also set the protection fee at a fixed percentage of the protected price. For example, at five percent, the protection fee for a protected price of $500 would be $25, and for a protected price of $800 it would be $40.

In some embodiments, the price protection system offers a variable protection fee based on the likelihood of an increase in ticket prices. For example, the price protection system may charge a higher fee for protection for an itinerary that is particularly prone to price increases. Many factors can make an increase likely, such as a holiday itinerary, an itinerary that is close to departure, an itinerary on dates of a large event (e.g., conventions, sporting events, and so on), an itinerary on which a specific carrier dominates a significant amount of the market, a carrier declaring bankruptcy that handles a large amount of capacity for a particular route, or a natural disaster. The risk may be beyond what the operator of the price protection system would be willing to protect against using the fixed price method described above, but a higher fee may make the risk manageable such that the system can still offer the consumer some protection. A variable fee allows the price protection system to determine the cost of protection based on the risk of a price increase. The fee may also vary based on other factors such as the historical price of the itinerary, the likely magnitude of an increase, and so on.

The price protection system may be used in conjunction with various pricing models for protection fees, including not charging a protection fee. For example, the price protection system may offer a subscription model. An entity (e.g., an individual consumer, travel agency, or corporation) may pay a periodic (e.g., annual) subscription fee for receiving price protection for its itineraries. When the entity tries to book a flight, then the price protection system provides a notification when price protection is available and its protected price. The entity can then accept the price protection and try to purchase a ticket for that itinerary during the protection period. If the entity pays more than the protected price for a ticket, then the entity can request compensation. Periodically, the provider of the price protection system can review the profitability of the subscription service being provided to an entity and can adjust the subscription fee as appropriate.

Informing the Consumer

In many cases, the price protection system can best help the consumer to make a risky purchase by increasing the amount of information available to the consumer about the risk.

In some embodiments, the price protection system reports a predicted price change to the consumer. Rather than simply reporting the current price of an itinerary to the consumer, the price protection system may predict the likely change in price of the itinerary. For example, although today's lowest price may be $250, the price protection system may inform the consumer that the price is likely to drop $50 within the next seven days. Based on this information, the consumer may decide to wait to buy a ticket for the itinerary for less money, but purchase protection to guard against the risk of the price going up. The price protection system may even offer a protected price that is less than the current lowest price to induce the consumer to purchase price protection. For example, if the current lowest price is $500 but it is predicted to drop to $300 over the next seven days, then the price protection system may set the protected price at $450. In such a case, the protection fee may be even less than the $50 difference between the current lowest price and the protected price. If the difference between the current lowest price and the protected price is greater than to the protection fee, then the consumer is assured that by purchasing the price protection the savings will be greater than the protection fee.

In some embodiments, the price protection system reports a degree of confidence to the consumer. A predictive price system deals with probabilities of various events, and a predicted price change usually has an associated probability of being correct. The price protection system can report the probability of a predicted price change being correct as a degree of confidence to the consumer. For example, the price protection system may report that the price of an itinerary is likely to increase by at least $50 over the next few days with a degree of confidence of 60%. This indicates to the consumer that there is a 60% chance of the price going up by at least $50, and a 40% chance of the price going down or going up by less than $50. The price protection system may report several price predictions with a degree of confidence for each. For example, the price protection system may report one degree of confidence for the price going up $50 or less, another for the price going up $100 or less, and another for the price going down $50 or more.

In some embodiments, the price protection system reports a recommended action to the consumer. For example, if the price protection system determines that the price of an itinerary is likely to increase, then the price protection system may be unwilling to offer protection and instead recommend that the consumer immediately purchase a ticket for the itinerary. Alternatively, if the price protection system determines that the price of the itinerary is likely to decrease, then the price protection system may offer protection based on a protected price and recommend that the consumer wait to purchase a ticket for the itinerary. In either case, the price protection system may offer to update the consumer when the price or recommendation changes, such as by sending an email notification.

In some embodiments, the price protection system reports the historical price of an itinerary to the consumer. The price protection system may report the historical price before or after the consumer purchases protection. For example, before the consumer purchases protection, the price protection system may report a price prediction to the consumer that indicates that the price will decrease by $50, and report a price history to the consumer that supports the prediction based on historical events similar to the current purchasing environment. After a consumer purchases protection, the price protection system may report a daily history of the lowest available ticket price for the itinerary to help the consumer know when to purchase their ticket for the itinerary. For example, if the price protection system predicts a lowest price of $200 for the next seven days when the consumer purchases protection and the price two days later is $199, then the consumer may decide to purchase a ticket on that day to secure the low price that is below historical trends.

Compensation and Redemption Price

In some embodiments, the redemption price is the lowest price found by the price protection system on the day the consumer purchases the ticket and the price protection system bases the amount of compensation on the difference between the protected price and the redemption price. In the event that the lowest price of the itinerary increases from the time the consumer purchases protection to the time the consumer purchases a ticket for the itinerary, the price protection system honors the protection by offering compensation to the consumer. One way of calculating the compensation is by determining the lowest available price on the day the consumer bought the ticket, and subtracting the protected price for which the price protection system protected the consumer. For example, if the protected price is $200, and the lowest available price on the day the consumer bought the ticket is $250, then the compensation offered is $50. Using this method, the price protection system does not necessarily need to know the actual price paid by the consumer, and this method protects the price protection system against the risk of an unsavvy or disinterested consumer that overpays for the ticket on a particular day by not purchasing the ticket for the lowest available price. The consumer also benefits, because the consumer may purchase a different class of service and still receive compensation. For example, although the consumer may have purchased protection based on a coach class ticket, the consumer may later decide to purchase a first class ticket. The consumer can still receive compensation for the increase in the price of the coach class ticket.

In some embodiments, the price protection system determines the redemption price based on the actual price paid for the ticket by the consumer, such as when the actual price paid is below the lowest tracked price for the itinerary. For example, if the protected price is $200, and the lowest price found during the protection period by the price protection system is $300, but the consumer actually pays $250, then the compensation using this method is $50. This protects the price protection system from over-compensating the consumer in the event that the consumer was able to find a lower price than the price protection system was tracking. This could happen if, for example, the consumer has a relationship with an airline that entitles the consumer to extra discounts not available to the public. The consumer reports the actual price paid to the price protection system following the purchase. The price protection system may also take additional steps to guard against fraud by verifying that the consumer actually purchased a ticket at the reported price, such as by verifying a confirmation number or credit card charge provided by the consumer.

Managing Risk

The success of a price protection system in part depends on its ability to successfully predict and manage risk so that the price of protection can be set such that more money is taken in during the normal course of business than is paid out. However, the more conservative the price protection system is with managing risk, the less value that the system offers to the consumer in terms of protection from risk, thereby making the consumer more likely to forego protection. Therefore, the operator of the price protection system will want to manage risk effectively in a way that offers value to the consumer while still producing a profit.

In some embodiments, the price protection system limits the number of protection requests open at any given time. By limiting the number of open protection requests, the price protection system reduces the exposure of the operator of the price protection system in the case of a catastrophic event. For example, if all ticket prices suddenly increased due to a sudden increase in the price of fuel, the operator of the price protection system would have less exposure if there were 1,000 open protection requests than if there were 10,000 open protection requests. The price protection system may limit the total number of open protection requests by limiting the number of users of the system and limiting the number of open protection requests for each user. For example, the price protection system may allow each user to have four protection requests open at a time, and then manage the number of users to provide the operator of the price protection system with a manageable level of exposure to risk. To help reduce risk associated with the occurrence of an unexpected event, the price protection system may set a cap on the compensation that a consumer will receive. For example, the price protection system may set the redemption price to the lower of the lowest price on the day of purchase or 150% of the protected price. In this way, the protection system will have a maximum compensation risk that is 50% of the protected prices.

In some embodiments, the price protection system limits the protection period. For example, the price protection system may set an expiration of one week on protection requests. The risk of any event increases as the period of the event's prediction increases. For example, it is safer to predict that an earthquake will not happen for the next week, than to predict that it will not happen for the next month. The price protection system may also set a variable protection period based on the determined amount of risk. By limiting the duration of protection requests, the price protection system keeps protection requests within a range over which prices can be more accurately predicted, and thereby reduces the risk to the operator of the price protection system that a loss will occur.

In some embodiments, the price protection system restricts protection offers for poorly performing markets. The price protection system may decline to offer protection for some markets or increase the price of protection in those markets that experience abnormal price fluctuations. For example, certain parts of the world may experience wildly changing ticket prices due to political unrest. The price protection system may not be able to predict prices in such environments with sufficient accuracy to provide an acceptable level of risk to the operator of the price protection system. Therefore, the price protection system may either not offer protection for those markets, or offer protection at a higher price that effectively strikes a balance between risk and profit. Similarly, the price protection system may restrict protection offers for itineraries that are dominated by certain airlines (e.g., if the airline recently declared bankruptcy or recently received a union notice of an impending strike), or difficult to predict periods (e.g., seven days before departure or holidays).

In some embodiments, the price protection system limits the time to submit a redemption request. As the number of days that a consumer can submit a redemption request increases, the number of consumers that will redeem the purchased protection also increases. In addition, having a high number of outstanding potential redemption requests leaves the operator of the price protection system uncertain of the potential compensation that the system will pay in a particular relevant period, such as a fiscal quarter. A longer redemption period also makes it more difficult to obtain evidence of the actual purchase price or lowest price on the purchase day on which to base the redemption price. By setting a limit on the allowable time for submitting a redemption request, the risk of receiving a substantial number of redemption requests or of uncertain redemption prices is reduced. For example, the system may allow consumers seven days after protection expires to submit a redemption request based on the protection.

The price protection system may offer price protection when it is predicted that the price is unlikely to change over time or when the direction of the price cannot be accurately predicted. In either case, the price protection system may offer price protection to a certain percentage of consumers. By offering such protection, the price protection system may find the revenue derived from the protection fees or from subsequent purchase of tickets through a service affiliated with the price protection service to be profitable. Offering price protection in such cases may also improve consumer loyalty as a consumer may be more likely to use the price protection service if offered price protection.

The following describes embodiments described above in further detail with reference to the figures.

FIG. 1 is a block diagram that illustrates components of the price protection system in one embodiment. The price protection system 100 contains an offer protection component 102, a process redemption component 132, and a user interface component 150. In some embodiments, the price protection system offers a web service interface (not shown) for accessing the features of the price protection system. For example, a travel agent web site can access web-based functionality for specifying an itinerary, receiving quotes for price protection, purchasing price protection, and so on.

The offer protection component 102 contains a receive itinerary specification component 105, a determine itinerary pricing component 110, a predict price component 115, a determine risk component 120, a receive protection request component 125, and a provide protection component 130. The receive itinerary specification component 105 receives a specification from a consumer that identifies one or more itinerary criteria. For example, the itinerary specification for an airline flight may contain a departure date, departure city, arrival city, and number of companions traveling. The determine itinerary pricing component 110 determines the current prices for tickets that match the received itinerary specification. For example, the determine itinerary pricing component 110 may consult online travel agents or other services to determine current ticket prices for a particular itinerary or other event. The predict price component 115 predicts the trends in the price of tickets matching the itinerary specification during the protection period. For example, the predict price component 115 may predict whether the price of the itinerary is likely to increase over the next week. The determine risk component 120 determines the risk of protecting a predicted price for the itinerary based on the predicted price and other factors, such as the route requested, fuel price trends, and so on. If the risk is too high, then the price protection system 100 may determine that the system will not offer protection to the consumer, or may offer protection at an increased price. The receive protection request component 125 receives a request from a consumer to purchase protection. The request may include additional information such as payment details, a preferred airline, or other information. The provide protection component 130 provides the consumer with the requested protection. The price protection system 100 may provide a list of open protection requests to the consumer for later viewing through the user interface component 150. The user interface component may also exchange information between the consumer and each of the other components of the price protection system 100.

The process redemption component 132 contains a receive redemption request component 135, a validate redemption request component 140, and a redeem protection component 145. The receive redemption request component 135 receives redemption requests from consumers that purchased protection. For example, if a consumer purchased protection and 1) the price of the lowest priced itinerary increased beyond the protected price locked in by the consumer and 2) the consumer purchased an itinerary at an increased price during the protection period, then the consumer may submit a redemption request to recover compensation for the difference in the price of the lowest priced itinerary on the date of the consumer's purchase and the protected price. The validate redemption request component 140 verifies that the consumer's request is valid. For example, the validate redemption request component 140 may verify that the consumer paid for the ticket and that the price the consumer indicated is correct. The redeem protection component 145 processes valid requests for payment. The consumer may receive a payment by check or other form such as credit card credit, online payment, bonus frequent flyer miles, PayPal, or credit towards the purchase of merchandise.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
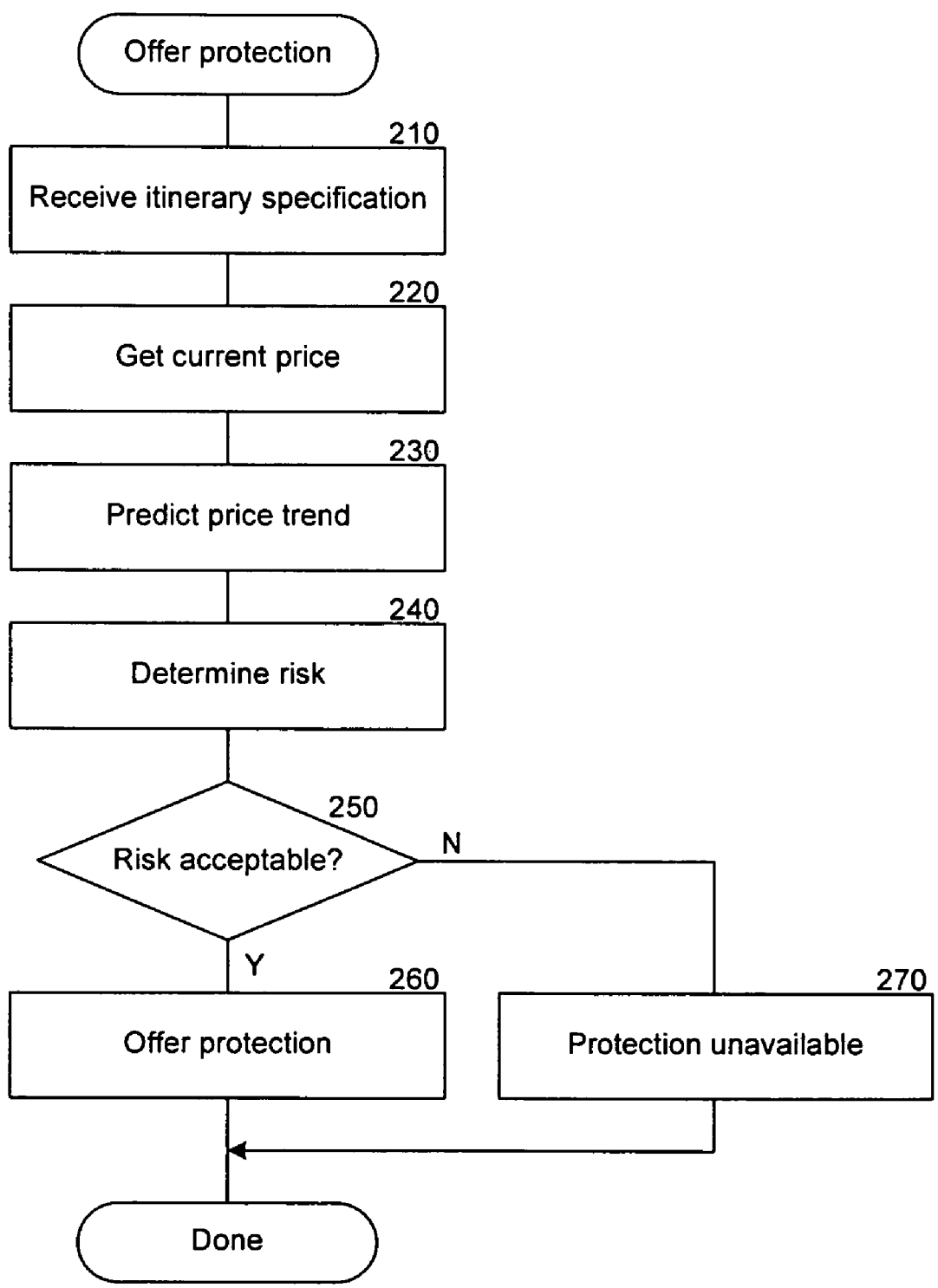
FIG. 2 is a flow diagram that illustrates the processing of the offer protection component of the system in one embodiment.

FIG. 2 is a flow diagram that illustrates the processing of the offer protection component of the system in one embodiment. The system invokes the component when a consumer requests a quote for protecting an itinerary price. In block 210, the component receives an itinerary specification that provides information about the type of itinerary that the consumer is seeking. For example, the itinerary specification may identify a flight by its number, or may contain information such as desired flight times, departure airport, and destination. In block 220, the component determines the current price of itineraries matching the received itinerary specification. For example, the component may invoke an external fare pricing service or online travel agent to determine the current price of itineraries. In block 230, the component predicts the trends in the prices of itineraries matching the received itinerary specification. For example, the component may determine whether the price is likely to increase or decrease based on historical trends and other information such as trends in fuel prices and employee salaries. In block 240, the component determines the risk associated with the predicted price. For example, the component may determine a degree of confidence in the predicted price or a probability that the price will follow the predicted trend. In decision block 250, if the determined risk is acceptable to the price protection system, then the component continues at block 260, else the component continues at block 270. In block 270, the component reports to the consumer that protection is unavailable. In block 260, the component offers the protection to the consumer for a fee. For example, the component may use a fixed fee, or may base the fee on the determined risk or other factors. The component then completes.

Figure 3:
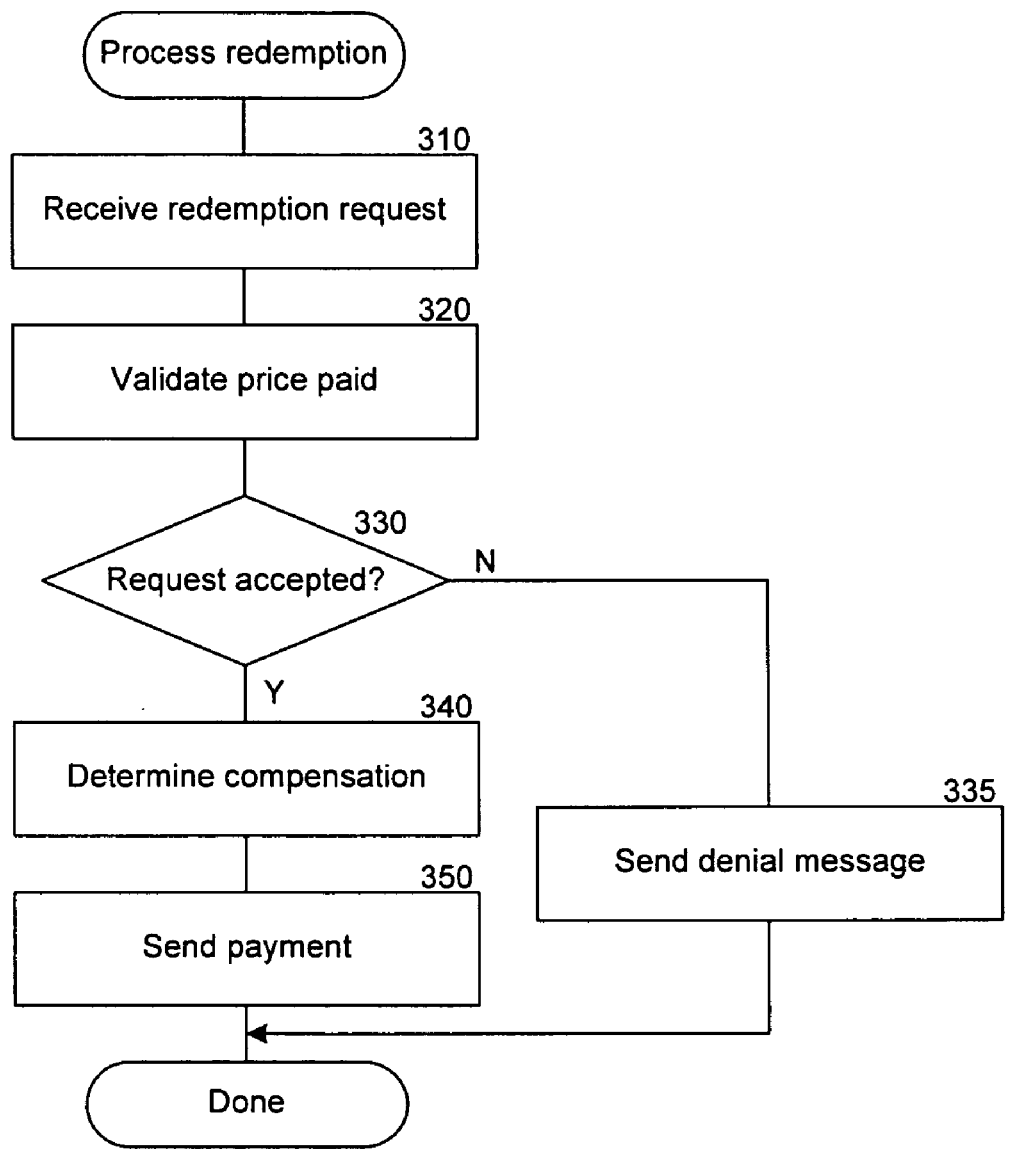
FIG. 3 is a flow diagram that illustrates the processing of the process redemption request component of the system in one embodiment.

FIG. 3 is a flow diagram that illustrates the processing of the process redemption request component of the system in one embodiment. The system invokes the component when a consumer submits a request to redeem protection. In block 310, the component receives a redemption request from a consumer. For example, the consumer may indicate that they purchased a ticket within the protection period for $50 more than the protected price. In block 320, the component validates the price paid by the consumer. For example, the component may verify the ticket purchase with an airline or other agency, or require that the consumer provide an airline confirmation number or send in a copy of the consumer's credit card statement to verify that the ticket was purchased and the price paid for the ticket. The component may also verify other information such as whether the consumer submitted the redemption request before the protection expired or before the end of a limited redemption period. In decision block 330, if the redemption request is accepted, then the component continues at block 340, else the component continues at block 335. In block 335, the component informs the consumer that the request was denied and then completes. In block 340, the component determines the redemption price and the compensation that is due to the consumer. The redemption price may be based on the price the consumer actually paid, such as if the price the consumer paid is less than the lowest price tracked by the price protection system, or on another amount such as the lowest available price for the ticket on the date the consumer completed the purchase. In block 350, the component sends a payment to the consumer based on the determined compensation. For example, the component may cause the system to issue a check to the consumer.

Figure 4:
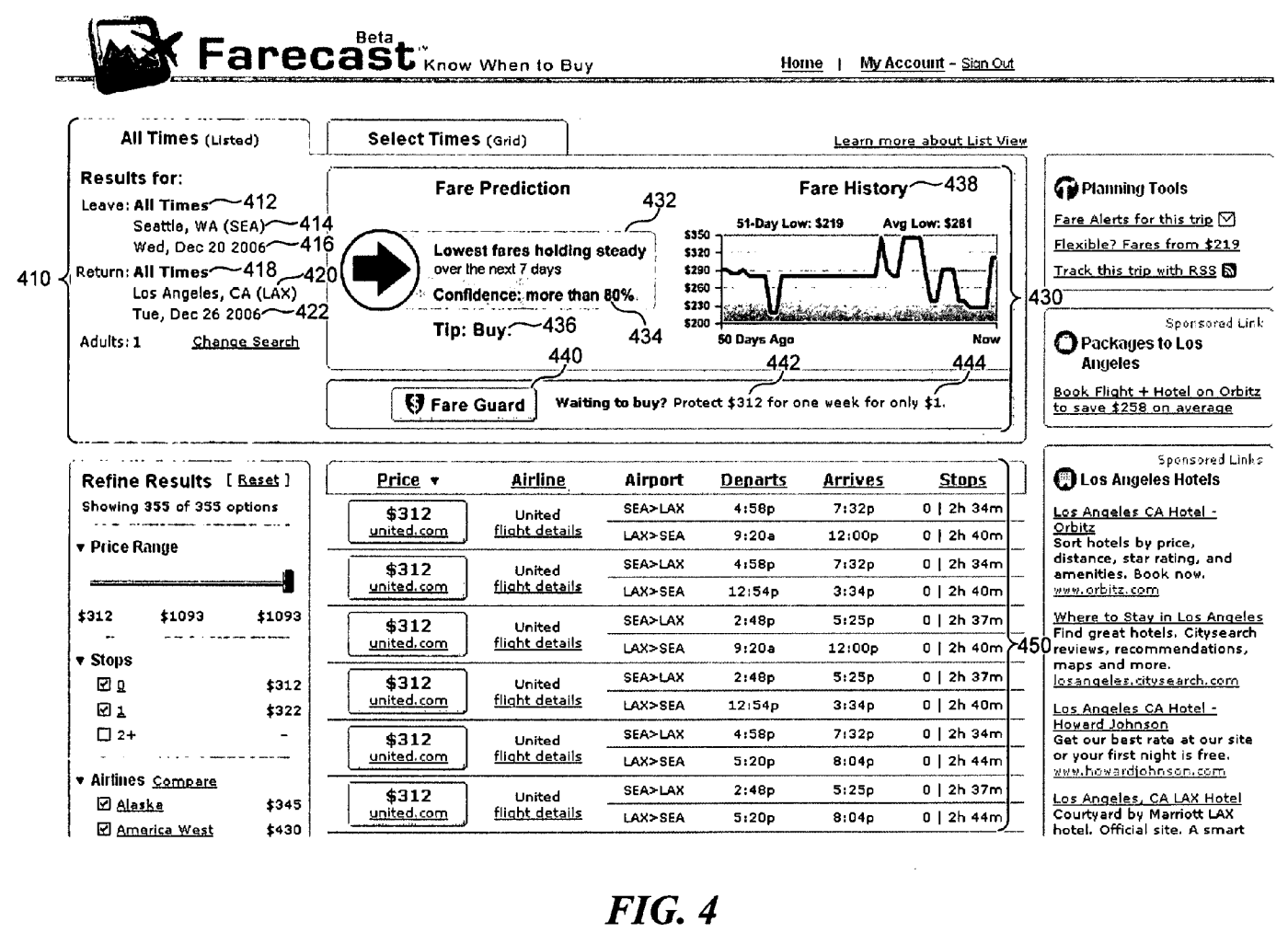

FIG. 4 illustrates a display page of the user interface of the price protection system for purchasing protection in one embodiment. For example, the display page could be a web page or screen produced by a desktop application for interacting with the consumer. The page includes an itinerary specification area 410, a list of matching itineraries 450, an itinerary lowest price prediction area 430, and a FareGuard button 440. The itinerary specification area 410 displays information about the type of itinerary specified by the consumer. For example, the itinerary specification area 410 may contain a departure time 412, a departure city 414 or airport, a departure date 416, an arrival time 418, an arrival city 420, an arrival date 422, and a number of traveling companions 424. The list of matching itineraries 450 lists currently available itineraries matching the itinerary specification and the corresponding prices. The itinerary lowest price prediction area 430 contains a prediction 432 of the likely trends in matching itinerary prices, a degree of confidence 434 in the prediction, a recommended action 436 based on the prediction, and a historical price graph 438. The prediction 432 indicates that the lowest itinerary prices are likely to hold steady, and the recommended action 436 indicates that the consumer should buy a ticket for the itinerary. However, to guard against an increase in lowest price itinerary prices if the consumer is not ready to purchase a ticket, the display page offers the consumer a FareGuard button 440 for purchasing protection to guard against the risk of increasing itinerary prices. Near the FareGuard button 440 the protected price 442 is specified along with a protection fee 444.

FIG. 5 illustrates a display page of the user interface of the price protection system when no protection is offered in one embodiment. FIG. 5 is similar to FIG. 4, except the prediction in this instance is that lowest price itinerary prices are likely to rise. The fare prediction 532 indicates that the price is likely to rise by $50 or more in the next seven days. The recommended action 536 indicates that the consumer should buy a ticket for the itinerary now to lock in the best price. Because the price protection system is predicting that prices are likely to increase, the system does not offer the consumer the opportunity to purchase protection. However, the consumer can use the fare alert button 540 to cause the system to notify the consumer if the trends in prices change such that protection is available.

FIG. 6 illustrates a display page of the user interface of the price protection system for confirming a purchase of protection in one embodiment. The page contains details 610 of protection selected by the consumer. The protection contains a protected price 620, an itinerary specification 630, an expiration date 640, and a protection fee 650. The protected price 620 is the price for which the consumer will be able to make a redemption request if the lowest price itinerary exceeds this price during the protection period. The itinerary specification 630 contains details about the type of itinerary protected, such as the departure city, arrival city, dates, and number of protected companions. The expiration date 640 indicates when the protection period expires. If the price increases after the protection period, then the consumer will not have a valid redemption request. The protection fee 650 indicates the amount charged by the operator of the price protection system for protecting the price. In this example, the system charges the consumer a flat fee of $9.95 for each of two instances of protection.

FIG. 7 illustrates a display page of the user interface of the price protection system for redeeming protection in one embodiment. The page includes protection details 710 about protection purchased by the consumer, redemption information 720, verification information 740 requested for verifying the redemption request, and booking information 750 requested about the ticket purchased by the consumer. The protection details 710 contain information about the protected price and type of itinerary for which the consumer purchased protection, such as the departure date and city. The redemption information 720 contains information about the compensation available to the consumer based on the booked ticket including the lowest fare 730 available on the booking day, and the resulting compensation 735. The verification information 740 requests that the consumer send evidence of the consumer's purchase so that the price protection system can verify the amount paid and date booked. The booking information 750 requests additional information about the booked ticket, such as how the consumer made the purchase, and the confirmation number of the purchased ticket. The system may also use this information to verify the consumer's purchase.

From the foregoing, it will be appreciated that specific embodiments of the price protection system have been described herein for purposes of illustration, but that various modifications may be made without deviating from the spirit and scope of the invention. For example, although the above uses airline tickets as an example, other non-travel-related purchases could also use the techniques described, such as those for purchasing goods, sports tickets, concert tickets, and so on. The price protection system may also be used to reduce the risk associated with fluctuations in prices of various items such as hotel room, automobile rentals, cruises, and so on. In addition, decisions other than purchases could use the described techniques to assist a consumer in making decisions and alleviating risk in various situations, such as predicting sports team wins, predicting political outcomes, and so on. In some embodiments, the price protection offered by the price protection system does not include a right to purchase the item (e.g., a ticket for itineraries) whose price is being protected. For example, the price protection system may be used independently of any system for selling the price-protected items. As such, a consumer may purchase price protection for an itinerary, but may be unable to actually purchase a ticket within the protection period because, for example, all of the flights matching the itinerary sell out very quickly for an unexpected reason, are canceled due to an airline emergency (e.g., a strike), and so on. Accordingly, the invention is not limited except as by the appended claims.

We claim:

1. A price protection system for protecting an flight itinerary price, the system comprising:

a memory storing computer-executable instructions of a component that receives predictions of likely directions of ticket prices for flight itineraries based on analysis of historical pricing information;

a component that receives from a purchaser a request for ticket price information for a desired flight itinerary specification, the desired flight itinerary indicating characteristics of the desired flight;

a component that, prior to the purchaser purchasing a ticket for the desired flight itinerary specification, offers to sell for a protection fee price protection for a protected price for the desired flight itinerary specification when the predictions indicate that the likely direction of a ticket price for a flight that matches the characteristics of the flight as indicated by the desired flight itinerary specification make it desirable to sell price protection;

a component that, prior to the purchaser purchasing a ticket for the desired flight itinerary specification, sells the offered price protection to the purchaser for the protection fee; and a component that, after the purchaser purchases the offered price protection for the desired flight itinerary specification and subsequently purchases a ticket for the desired flight itinerary specification at a purchase price that is higher than the protected price, establishes a redemption price for the price protection and compensates the purchaser based on the protected price and the redemption price, the redemption price being based on a ticket price for the desired flight itinerary specification after the purchaser purchases the price protection and being identified independently of the purchase price, wherein the purchaser is compensated only when a ticket for the desired flight itinerary specification is purchased within a protection period, and wherein the protection period is variable based on risk associated with the price protection; and a processor for executing the computer-executable instructions stored in the memory.

2. The system of claim 1 wherein it is desirable to sell price protection when the likely direction is to decrease.

3. The system of claim 1 wherein it is desirable to sell price protection for some flight itinerary specifications when the likely direction is not to decrease.

4. The system of claim 1 wherein the protected price is the lowest ticket price for the desired flight itinerary specification at the time of the offer.

5. The system of claim 1 wherein the redemption price is the lowest ticket price for the desired flight itinerary specification when the ticket is purchased.

6. The system of claim 1 wherein the compensation is the difference between the redemption price and the protected price.

7. The system of claim 1 wherein the price protection is offered for a protection fee.

8. The system of claim 7 wherein the protection fee is fixed.

9. The system of claim 7 wherein the protection fee varies based on risk associated with the price protection.

10. The system of claim 1 wherein it is desirable to sell price protection when the likely direction is to decrease, wherein the price protection is offered for a fixed protection fee and for a fixed protection period, and wherein the compensation is the difference between the redemption price and the protected price.

11. The system of claim 1 including a component that receives a request for compensation from the purchaser, verifies purchase of the ticket, and authorized compensation.

12. A method of protecting an airline itinerary price performed by one or more computers executing instructions of a computer program, the method comprising:

receiving at a computer an itinerary specification from a purchaser that describes characteristics of desired itineraries;

receiving at a computer predictions of price fluctuations for itineraries matching the itinerary specification, the prediction being generated based on analysis of historical price information, an itinerary matching the itinerary specification when the characteristics of the itinerary match the characteristics of the itinerary specification;

offering by the computer, based on the received predictions, to the purchaser price protection at a protected price for a subsequent purchase of a ticket for an itinerary matching the itinerary specification for a protection period, the price protection providing protection in the event the purchaser subsequently purchases a ticket for a itinerary matching the itinerary specification at a price higher than the protected price; and receiving an indication that the purchaser subsequently purchased a ticket for an itinerary matching the itinerary specification at a purchase price;

when the purchase price is greater than the protected price, directing payment to the purchaser for an amount based on the difference between a lowest price available for a ticket for an itinerary matching the itinerary specification and the protected price, the lowest price being identified independently of the purchase price, wherein the payment is directed to the purchaser only when the ticket for the itinerary matching the itinerary specification at the purchase price is purchased within a protection period, and wherein the protection period is variable based on risk associated with the price protection; and when the purchase price is not greater than the protected price, indicating that the purchaser is not entitled to payment.

13. The method of claim 12 further comprising after receiving the itinerary specification, reporting currently available itinerary prices to the purchaser.

14. The method of claim 12 further comprising receiving a request from the purchaser to purchase the price protection.

15. The method of claim 12 wherein the protection period comprises a fixed time period.

16. The method of claim 12 wherein offering of price protection comprises requesting a protection fee.

17. The method of claim 16 wherein the protection fee requested varies based on the prediction of price fluctuations.

* * * * *